US012698378B1

(12) United States Patent
Takane et al.

(10) Patent No.: US 12,698,378 B1
(45) Date of Patent: Aug. 4, 2026

(54) GLASS-FIBER-CONTAINING FLAME-RETARDANT POLYCARBONATE RESIN COMPOSITION AND MOLDED OBJECT

(71) Applicant: ADEKA CORPORATION, Tokyo (JP)

(72) Inventors: Ryo Takane, Saitama (JP); Fumihiko Sato, Saitama (JP); Michio Nakamura, Saitama (JP); Genta Kokura, Saitama (JP)

(73) Assignee: ADEKA CORPORATION, Tokyo (JP)

( * ) Notice: Subject to any disclaimer, the term of this patent is extended or adjusted under 35 U.S.C. 154(b) by 408 days.

(21) Appl. No.: 17/909,942

(22) PCT Filed: Mar. 29, 2021

(86) PCT No.: PCT/JP2021/013345
§ 371 (c)(1),
(2) Date: Sep. 7, 2022

(87) PCT Pub. No.: WO2021/200841
PCT Pub. Date: Oct. 7, 2021

(30) Foreign Application Priority Data

Mar. 30, 2020 (JP) ................................. 2020-061313

(51) Int. Cl.
*C08K 5/521* (2006.01)
*C08K 7/14* (2006.01)

(52) U.S. Cl.
CPC ................ *C08K 5/521* (2013.01); *C08K 7/14* (2013.01); *C08K 2201/004* (2013.01)

(58) Field of Classification Search
CPC ..... C08K 5/521; C08K 7/14; C08K 2201/004
See application file for complete search history.

(56) References Cited

U.S. PATENT DOCUMENTS

| | | | | |
|---|---|---|---|---|
| 6,417,319 | B1 * | 7/2002 | Shibuya ................. | C08K 5/523 528/196 |
| 2003/0171463 | A1 * | 9/2003 | Weinberg .............. | C07F 9/1406 524/115 |
| 2010/0316860 | A1 | 12/2010 | Isozaki et al. | |
| 2016/0068663 | A1 | 3/2016 | Sakurai et al. | |
| 2016/0280910 | A1 | 9/2016 | Erkelenz et al. | |

FOREIGN PATENT DOCUMENTS

| | | | |
|---|---|---|---|
| CN | 105209551 | A | 12/2015 |
| EP | 1 327 635 | A1 | 7/2003 |
| JP | 3939656 | B2 | 7/2007 |
| JP | 2008-163315 | A | 7/2008 |
| JP | 2011-231283 | A | 11/2011 |
| JP | 2012-52065 | A | 3/2012 |
| JP | 5289056 | B2 | 9/2013 |
| JP | 2016-539228 | A | 12/2016 |
| JP | 2019-156996 | A | 9/2019 |
| WO | WO 02/062900 | A1 | 8/2002 |

OTHER PUBLICATIONS

English machine translation of JP 3939656B. (Year: 2007).*
English machine translation of JP 2012-052065A. (Year: 2012).*
International Search Report for PCT/JP2021/013345 mailed on May 18, 2021.
Written Opinion of the International Searching Authority for PCT/JP2021/013345 mailed on May 18, 2021.
"ADK STAB," Adeka Corporation, Polymer Additives, J05-0617B, No. 10-9, https://www.adeka.co.jp/chemical/catalog/pdf/J05-0617B%20No.10-9.pdf, 16 pages total.
"PX-200 (Resorcinol bis (2.6-dixylenyl phosphate) / RDX)," Daihachi Chemical Industry Co., Ltd., https://www.daihachichem.co.jp/jp/flame_retardants/px-200/, Retreived online on Jan. 14, 2025, 5 pages total, with English translation.
Japanese Office Action for Japanese Application No. 2022-512224, dated Dec. 17, 2024, with English translation.

* cited by examiner

*Primary Examiner* — John E Uselding
(74) *Attorney, Agent, or Firm* — Birch, Stewart, Kolasch & Birch, LLP

(57) ABSTRACT

Provided is a halogen-free, glass-fiber-containing, flame-retardant polycarbonate resin composition with excellent flame resistance and excellent rigidity, and a molded object thereof, using as little fluorine-containing resin as possible. Provided is a glass-fiber-containing flame-retardant polycarbonate resin composition containing (A) a polycarbonate resin, (B) glass fibers, and (C) a phosphate flame retardant. The composition contains from 40 to 80 parts by mass of the (A) component, from 5 to 50 parts by mass of the (B) component, and from 5 to 30 parts by mass of the (C) component, with respect to 100 parts by mass of the total of the (A) to (C) components.

9 Claims, No Drawings

GLASS-FIBER-CONTAINING FLAME-RETARDANT POLYCARBONATE RESIN COMPOSITION AND MOLDED OBJECT

TECHNICAL FIELD

This invention relates to a flame-retardant polycarbonate resin composition in which glass-fiber is blended (glass-fiber-containing flame-retardant polycarbonate resin composition, hereinafter also simply referred to as "resin composition"), and a molded object obtained by molding such a resin composition.

BACKGROUND ART

A polycarbonate resin has excellent mechanical properties and thermal properties and is widely used industrially, including in the automotive, office automation equipment, and electrical and electronics fields. Examples of characteristics of a polycarbonate resin include a polarity due to the molecular structure, a strong intermolecular force, and its amorphous and transparent nature. A polycarbonate resin is used in a variety of applications as an excellent engineering plastic since such a resin has a wide elastic range and also exhibits high Izod impact strength values. In particular, taking into consideration its high transparency, such a resin is widely used for glass substitute applications or optical applications such as optical disks.

On the other hand, there are strong demands for flame retardancy of synthetic resin materials used, especially in applications such as office automation equipment and home appliances, and a number of flame retardants have been developed and studied to meet these demands.

In recent years, resin members have become thinner as a variety of products have become smaller and lighter, and higher rigidity is increasingly required. Furthermore, in general, as the thickness of a resin member becomes thinner, the flame retardancy of the member tends to decrease, and therefore, a resin composition with more excellent flame retardant performance is being developed.

Conventionally, halogenated flame retardants have been mainly used to make polycarbonate resins flame retardant. Although halogenated flame retardants have excellent flame retardant effects, they have problems with thermal decomposition during resin molding, which generates hydrogen halide, causing mold corrosion or resin discoloration. Halogenated flame retardants have a problem of generating a large amount of smoke and corrosive hydrogen halide gas, which is harmful to the human body, when burned in a fire or the like. Furthermore, halogenated flame retardants are often combined with antimony trioxide or the like as a flame retardant aid, causing health problems for workers handling them and impairing the excellent mechanical properties and transparency inherent in polycarbonate resin.

To address these problems, halogen-free flame-retardant materials are being examined, and one such method has been proposed to make polycarbonate resin flame-retardant by using phosphate flame retardants. For example, in Patent Document 1 or Patent Document 2, a flame-retardant polycarbonate resin composition containing a phosphate flame retardant and an inorganic filler are proposed, respectively, and examples with excellent mechanical properties such as flame retardancy and rigidity are described.

"Halogen-free" and similar statements in the present invention mean that chlorine in a resin composition is 900 ppm or less, bromine is 900 ppm or less, and the sum of chlorine and bromine is 1,500 ppm or less, in accordance with the International Standard IEC 61249-2-21 of the International Electrotechnical Commission (IEC).

RELATED ART DOCUMENTS

Patent Documents

[Patent Document 1] JP2012-052065A
[Patent Document 2] JP2008-163315A

SUMMARY OF THE INVENTION

Problems to be Solved by the Invention

However, although there is a case in which the technology described in the above Patent Document 1 has achieved a V-O rank in the UL-94V flame retardancy test (1.6 mm thickness), a flame retardant aid containing polytetrafluoroethylene (PTFE) was added in the composition. The technology described in the above Patent Document 2 also contained PTFE in the resin composition, although a V-O rank was achieved at a thickness of 1.2 mm in the UL-94V flame retardancy test.

Fluorinated resins represented by PTFE are known as flame retardants (anti-drip agents) with excellent anti-drip effects, which cause molding defects, especially in the injection molding of thin products, since they reduce the melt flowability of resins during molding processes. Although fluorine is not a target element for halogen-free of the above-described IEC standard, fluorine is generally classified as a halogen element. For these reasons, there has been a persistent demand in the market for flame-retardant resin compositions that, in addition to being halogen-free under the above-described IEC standard, do not contain fluorine-containing resins either.

Accordingly, an object of the present invention is to provide a halogen-free, glass-fiber-containing, flame-retardant polycarbonate resin composition with excellent flame resistance and excellent rigidity, and a molded object thereof, using as little fluorine-containing resin as possible.

Means for Solving the Problems

The present inventors studied intensively to solve the above-described problems, thereby completing the present invention.

Specifically, the glass-fiber-containing flame-retardant polycarbonate resin composition of the present invention is a glass-fiber-containing flame-retardant polycarbonate resin composition containing (A) a polycarbonate resin, (B) glass fibers, and (C) a phosphate flame retardant, wherein the composition contains from 40 to 80 parts by mass of the (A) component, from 5 to 50 parts by mass of the (B) component, and from 5 to 30 parts by mass of the (C) component, with respect to 100 parts by mass of the total of the (A) to (C) components.

In the resin composition of the present invention, it is preferred that the (C) phosphate flame retardant is one or more compounds having the structures represented by the following general formulas (1) to (4). In particular, it is more preferred that the (C) phosphate flame retardant is a compound having a structure represented by the following general formula (2).

(1)

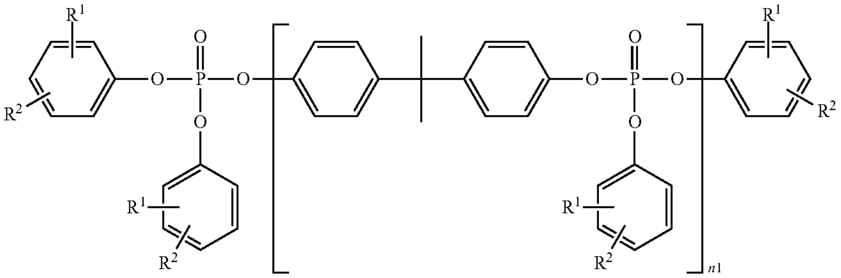

In the above formula (1), $R^1$ and $R^2$ each independently represent a hydrogen atom or a methyl group, and n1 represents an integer from 1 to 7.

(2)

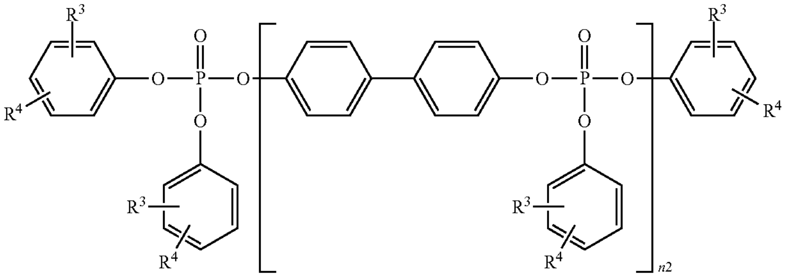

In the above formula (2), $R^3$ and $R^4$ each independently represent a hydrogen atom or a methyl group, and n2 represents an integer from 1 to 7.

(3)

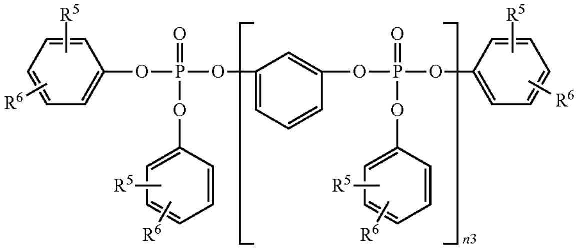

In the above formula (3), $R^5$ and $R^6$ each independently represent a hydrogen atom or a methyl group, and n3 represents an integer from 1 to 7.

(4)

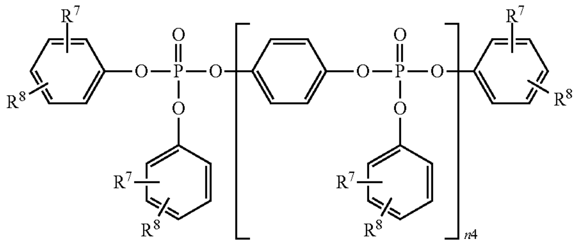

In the above formula (4), $R^7$ and $R^8$ each independently represent a hydrogen atom or a methyl group, and n4 represents an integer from 1 to 7.

In the resin composition of the present invention, it is preferred that the content of the (B) glass fibers is from 10 to 40 parts by mass with respect to 100 parts by mass of the total of the (A) to (C) components. In the resin composition of the present invention, it is possible that 0.15 parts by mass or less of a fluorine-containing resin is contained in 100 parts by mass of the glass-fiber-containing flame-retardant polycarbonate resin composition. In particular, it is preferred that the resin composition of the present invention does not contain the fluorine-containing resin, and it is especially preferred that the resin composition does not contain polytetrafluoroethylene (PTFE).

Furthermore, in the resin composition of the present invention, the (B) glass fibers are chopped strands of converged single fibers, and preferably the cut length of the chopped strands is from 1.0 mm to 5.0 mm. Furthermore, it is also possible that the resin composition of the present invention is in pellet form.

The molded object of the present invention is a molded object characterized by being obtained from the glass-fiber-containing flame-retardant polycarbonate resin composition. The molded object of the present invention preferably has a thickness of from 0.1 mm to 1.0 mm.

Effects of the Invention

According to the present invention, a glass-fiber-containing flame-retardant polycarbonate resin composition having excellent flame-retardancy and rigidity and a molded object thereof can be provided.

MODE FOR CARRYING OUT THE INVENTION

Hereinafter, embodiments of the present invention will be described in detail.

<Glass-Fiber-Containing Flame-Retardant Polycarbonate Resin Composition>

The glass-fiber-containing flame-retardant polycarbonate resin composition of the present invention is a glass-fiber-containing flame-retardant polycarbonate resin composition containing (A) a polycarbonate resin, (B) glass fibers, and (C) a phosphate flame retardant, wherein the composition contains from 40 to 80 parts by mass of the (A) component, from 5 to 50 parts by mass of the (B) component, and from 5 to 30 parts by mass of the (C) component, with respect to 100 parts by mass of the total of these (A) to (C) components.

((A) Polycarbonate Resin)

The (A) polycarbonate resin used in the present invention is a polymer having a carbonate bond and can be obtained, for example, from a monocyclic or polycyclic aromatic compound (hereafter, referred to as "polyhydroxyaromatic compound") containing two or more hydroxyl groups, each of which is directly bonded to a carbon atom of an aromatic ring, and a carbonate precursor. The (A) polycarbonate resin is not particularly restricted in the structure, the manufacturing method, the chain stopper, the molecular weight, or the like, and may be branched. The resin may be used as a mixture of one or more types, and may contain a known polymer component used in mixture with polycarbonate such as polyester.

A (A) polycarbonate resin is generally obtained from a divalent hydroxyaromatic compound and a carbonate precursor, and is preferably a compound having a structure represented by the following general formula (5).

(5)

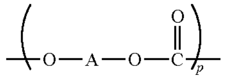

In the above formula (5), A represents a residue of a dihydroxyaromatic compound used in a polymerization reaction, represented by the following general formula (6) or (7), and p represents a number of 2 or more.

(6)

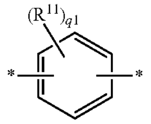

(7)

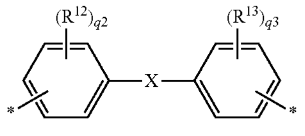

In the above formulas (6) and (7), * represents a bonding hand with an adjacent oxygen atom, $R^{11}$, $R^{12}$, and $R^{13}$ each independently represent a hydrogen atom, a halogen atom, an alkyl group, an alkoxy group, a cycloalkyl group, an aryl group, an alkylaryl group, or an arylalkyl group, q1, q2, and q3 each independently represent an integer from 0 to 4, and X represents an alkylene group, a cycloalkylidene group, a direct bond, a sulfide bond, a disulfide bond, an ether bond, a sulfinyl group, a sulfonyl group, or a carbonyl group.

Examples of the halogen atom represented by the above $R^{11}$, $R^{12}$, and $R^{13}$ include fluorine, chlorine, bromine, and iodine, examples of the alkyl group include a methyl group, an ethyl group, a propyl group, an isopropyl group, a butyl group, a sec-butyl group, a tert-butyl group, an isobutyl group, an amyl group, an isoamyl group, a tert-amyl group, a hexyl group, a cyclohexyl group, a heptyl group, an isoheptyl group, a tert-heptyl group, an n-octyl group, an isooctyl group, a tert-octyl group, and a 2-ethylhexyl group, examples of the alkoxy group include a group derived from the alkyl group, examples of the cycloalkyl group include a cyclobutyl group, a cyclopentyl group, a cyclohexyl group, or a substituent thereof, examples of the aryl group and the alkyl aryl group include a phenyl group, a methylphenyl group, a dimethylphenyl group, an ethylphenyl group, an octylphenyl group, a nonylphenyl group, a bromophenyl group, and a naphthyl group, and examples of the arylalkyl group include a benzyl group and a phenethyl group.

Examples of the alkylene group represented by X include a methylene group, an ethylene group, an ethane-1,1-diyl group, a propylene group, a propane-2,2-diyl group, a 1-methylethylene group, a butylene group, a 1-methylpropylene group, a 2-methylpropylene group, a 2,2-dimethylpropylene group, a 1,3-dimethylpropylene group, a 1-methylbutylene group, a 2-methylbutylene group, a 3-methylbutylene group, a 4-methylbutylene group, a 2,4-dimethylbutylene group, a 1,3-dimethylbutylene group, a pentylene group, a hexylene group, a heptylene group, and an octylene group, and examples of the cycloalkylidene group include a cyclopentylidene group, a cyclohexylidene group, and a substituent thereof.

Examples of the polyhydroxyaromatic compound used as a raw material for a polycarbonate resin include those corresponding to A in the above-described general formula (5). Specific examples thereof include a dihydroxybenzene such as resorcinol, catechol, hydroquinone, 2-methylresorcinol, 2-ethylresorcinol, 2-propylresorcinol, 2-butylresorcinol, 2-tert-butylresorcinol, 2-phenylresorcinol, 2-cumylresorcinol, 2-methylhydroquinone, 2-ethylhydroquinone, 2-propylhydroquinone, 2-butylhydroquinone, 2-tert-butylhydroquinone, 2-phenylhydroquinone, or 2-cumylhydroquinone; a bishydroxyaryl such as 4,4'-dihydroxydiphenyl; a bis(hydroxyaryl)cycloalkane such as 1,1-bis(4-hydroxyphenyl)-2,4,4-trimethylcyclopentane, 1,1-bis(4-hydroxyphenyl)cyclohexane, 1,1-bis(4-hydroxyphenyl)-3,3-dimethylcyclohexane, 1,1-bis(4-hydroxyphenyl)cyclohexane, 1,1-bis(4-hydroxyphenyl)-3,3,5-trimethylcyclohexane, 1,1-bis(4-hydroxy-3,5-dimethylphenyl)cyclohexane, 1,1-bis(4-hydroxyphenyl)cyclododecane, 1,1-bis(4-hydroxy-3,5-dimethylphenyl)cyclododecane, or 1,1-bis(4-hydroxyphenyl)cyclododecane; a bis(hydroxyaryl)aryl such as 1,4-bis(4-hydroxyphenylsulfonyl)benzene or 4,4-bis(4-hydroxyphenylsulfonyl)benzene; a bis(hydroxyaryl)alkane such as bis(4-hydroxyphenyl)methane, 1,1-bis(4-hydroxyphenyl)ethane, 1,2-bis(4-hydroxyphenoxy)ethane, 1,4-bis(4-hydroxyphenyl)propane, 2,2-bis(4-hydroxyphenyl)propane, 2,2-bis(3-chloro-4-hydroxyphenyl)propane, 2,2-bis(3,5-dichloro-4-hydroxyphenyl)propane, 2,2-bis(4-hydroxy-3,5-dimethylphenyl)propane, 2,2-bis(4-hydroxy-3,5-dibromophenyl)propane, 2,2-bis(4-hydroxyphenyl-3-methylphenyl)propane, 2,2-bis(4-hydroxyphenyl-3-cyclohexylphenyl)propane, 2,2-bis(4-hydroxy-3-tert-butylphenyl)propane, 2,2-bis(4-hydroxyphenyl-3-methoxyphenyl)propane, 1,1-bis(4-hydroxyphenyl)butane, 1,1-bis(4-hydroxyphenyl)isobutane, 2,2-bis(4-hydroxy)butane, or 2,4-bis(4-hydroxyphenyl2-methyl)butane; a dihydroxyaryl ketone such as bis(4-hydroxyphenyl)ketone or bis(4-hydroxy-3-methylphenyl)ketone; a dihydroxyaryl ether such as 4,4'-dihydroxydiphenyl ether, 4,4'-dihydroxy-3,3'-dimethylphenyl ether, or 4,4'-dihydroxy-2,5-dihydroxydiphenyl ether; a dihydroxyaryl sulfur compound such as 4,4'-thiodiphenol, bis(4-hydroxyphenyl)sulfide, 4,4'-dihydroxy-3,3'-dimethyldiphenyl sulfide, 4,4'-dihydroxy-3,3'-dimethyldiphenyl sulfoxide, 2,2-bis(4-hydroxyphenyl) sulfone, 4,4'-dihydroxydiphenyl sulfone, or 4,4'-dihydroxy-3,3'-dimethyldiphenyl sulfone; and phenolphthalein. Examples of the polyhydroxyaromatic compound other than those corresponding to A in the above general formula (5) include those having a condensed ring such as 2,2,2',2'-tetrahydro-3,3,3',3'-tetramethyl-1,1'-spirobis(1H-indene)-7,7'-diol. These may be used singly or in a mixture of two or more kinds, and may also be used in a mixture with a trivalent or more polyvalent hydroxyaromatic compound.

Examples of a carbonate precursor, which is a raw material for a polycarbonate resin, include a carbonyl halide, carbonyl ester, and haloformate. Suitable specific examples thereof include phosgene, a carbonic acid diester, diphenylcarbonate, dihaloformate of divalent phenol, and a mixture thereof.

The weight average molecular weight of the polycarbonate resin used in the present invention is preferably from 10,000 to 200,000, and more preferably from 20,000 to 60,000. When the weight average molecular weight is less than 10,000, the impact resistance of a molded product may decrease, and when the weight average molecular weight exceeds 200,000, flowability may decrease and processing may become difficult.

For the above-described reasons, a chain stopper may be used to control the molecular weight during production of a polycarbonate resin. Examples of a chain stopper used in this case include a long-chain alkylphenol such as phenol, p-chlorophenol, p-tert-butylphenol, 2,4,6-tribromophenol, or 4-(1,3-tetramethylbutyl)phenol; and a phenolic compound such as 3,5-di-tert-butylphenol, p-isooctylphenol, p-tert-octylphenol, p-dodecylphenol, 2-(3,5-dimethylheptyl) phenol, or 4-(3,5-dimethylheptyl)phenol. A typical amount of these chain-stoppers used is from 0.5 to 10 mol % of diphenol in a polyhydroxyaromatic compound used.

The content of (A) component is from 40 to 80 parts by mass for 100 parts by mass of the total of the (A) to (C) components of the present invention, and from the viewpoint of processability, flame retardancy, and drip prevention, the content is preferably from 45 to 75 parts by mass, and more preferably from 50 to 70 parts by mass.

((B) Glass Fiber)

The (B) glass fibers used in the present invention may be treated with a surface treatment agent in order to provide favorable wettability, adhesion, or the like with a polycarbonate resin. Examples of the surface treatment agent include a silane-based, titanate-based, aluminum-based, chromium-based, zirconium-based, and borane-based coupling agent, and among these, a silane-based coupling agent and a titanate-based coupling agent are preferred, and in particular, a silane-based coupling agent is suitable. Examples of such a silane-based coupling agent include triethoxysilane, vinyl tris(β-methoxyethoxy)silane, γ-methacryloxypropyltrimethoxysilane, γ-glycidoxypropyltrimethoxysilane, β-(3,4-epoxysyclohexyl)ethyltrimethoxysilane, N-β-(aminoethyl)-γ-aminopropyltrimethoxysilane, N-β-(aminoethyl)-γ-aminopropylmethyldimethoxysilane, γ-aminopropyltriethoxysilane, N-phenyl-γ-aminopropyltrimethoxysilane, N-phenyl-γ-aminopropyltrimethoxysilane, γ-mercaptopropyltrimethoxysilane, and γ-chloropropyltrimethoxysilane.

For the above-described glass fibers, a sizing agent may be used to bundle the glass fibers. Examples of the sizing agent include a polypropylene resin, a polyurethane resin, a polyester resin, an acrylic resin, an epoxy resin, starch, and vegetable oil.

For the (B) glass fibers used in the present invention, commercially available glass fibers can be used.

The (B) glass fiber used in the present invention is preferably chopped strands obtained by bundling single fibers from the viewpoints of processability, flame retardancy, and drip prevention. The cut length of chopped strands is preferably from 1.0 mm to 5.0 mm, and more preferably from 2.0 mm to 4.0 mm, from the viewpoint of processability and flame retardancy. The diameter of single fibers is preferably from 8 μm to 16 μm, and more preferably from 10 μm to 14 μm, from the viewpoint of processability and flame retardancy.

The content of (B) glass fibers of the resin composition of the present invention is from 5 to 50 parts by mass for 100 parts by mass of the total of the (A) to (C) components of the present invention, and from the viewpoint of processability, flame retardancy, and drip prevention, is preferably from 10 to 40 parts by mass, and more preferably from 10 to 30 parts by mass.

((C) Phosphate Flame Retardant)

For the (C) phosphate flame retardant used in the present invention, any of generally known flame retardants may be used, and from the viewpoints of flame retardancy and rigidity, one or more of phosphate compounds having structures represented by the following general formulas (1) to (4) is preferable, among others, a phosphate ester compound having a structure represented by the following general formula (2) is more preferable, and a compound having a structure represented by the following general formula (2), where $R^3$ and $R^4$ are hydrogen atoms, is still more preferable from the viewpoints of storage stability and handleability.

(1)

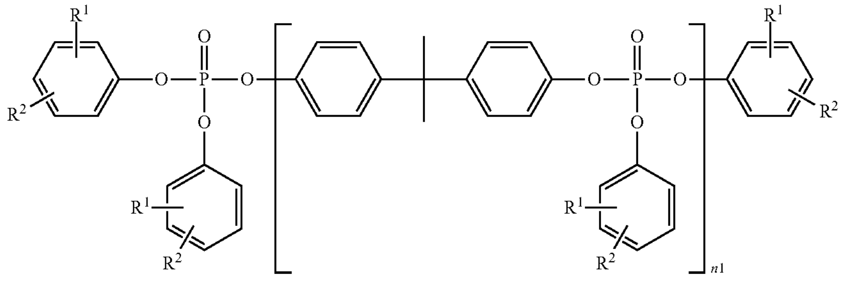

In the above formula (1), $R^1$ and $R^2$ each independently represent a hydrogen atom or a methyl group, and n1 represents an integer from 1 to 7.

(2)

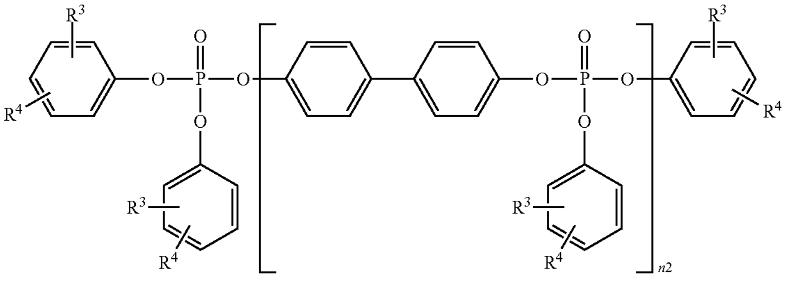

In the above formula (2), $R^3$ and $R^4$ each independently represent a hydrogen atom or a methyl group, and n2 represents an integer from 1 to 7.

(3)

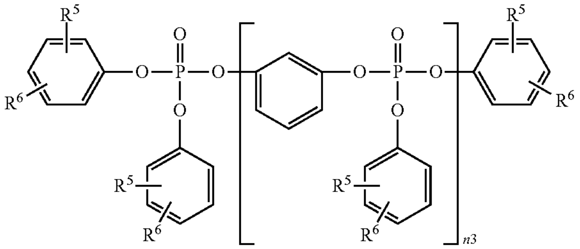

In the above formula (3), $R^5$ and $R^6$ each independently represent a hydrogen atom or a methyl group, and n3 represents an integer from 1 to 7.

(4)

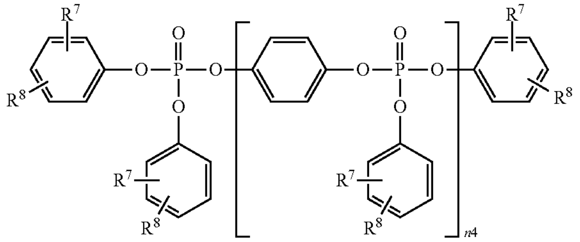

In the above formula (4), $R^7$ and $R^8$ each independently represent a hydrogen atom or a methyl group, and n4 represents an integer from 1 to 7.

A phosphate compound represented by the above general formula (1) (hereinafter, also referred to as "phosphate compound (1)") is a compound containing one or more compounds in which n1 is 1, 2, 3, 4, 5, 6 or 7, including a compound in which n1 is at least 1.

A phosphate compound represented by the above general formula (2) (hereinafter, also referred to as "phosphate compound (2)") is a compound containing one or more compounds in which n2 is 1, 2, 3, 4, 5, 6 or 7, including a compound in which n2 is at least 1.

A phosphate compound represented by the above general formula (3) (hereinafter, also referred to as "phosphate compound (3)") is a compound containing one or more compounds in which n3 is 1, 2, 3, 4, 5, 6 or 7, including a compound in which n3 is at least 1.

A phosphate compound represented by the above general formula (4) (hereinafter, also referred to as "phosphate compound (4)") is a compound containing one or more compounds in which n4 is 1, 2, 3, 4, 5, 6 or 7, including a compound in which n4 is at least 1.

The total content of compounds in which n1 to n4 are 1, 2, 3, 4, and 5 with respect to 100% by mass of the total of compounds in which n1 to n4 are 1, 2, 3, 4, 5, 6, or 7 in each of the above phosphate compounds (1) to (4) is preferably from 97% by mass to 100% by mass, and more preferably 100% by mass, from the viewpoint of storage stability and handleability. Each of the above phosphate ester compounds (1) to (4) does not necessarily contain all of the compounds in which n1 to n4 are 2, 3, 4, and 5. The content of compounds in which n1 to n4 are 1, 2, 3, 4, 5, 6, or 7 in each of the above phosphate ester compounds (1) to (4) can be determined by liquid chromatography.

The content of compounds in which n1 to n4 are 1 with respect to 100% by mass of the total of compounds in which n1 to n4 are 1, 2, 3, 4, 5, 6, or 7 in each of the above phosphate compounds (1) to (4) is preferably from 50% by mass to 100% by mass, more preferably from 55% by mass to 95% by mass, and still more preferably from 60% by mass to 70% by mass, from the viewpoint of storage stability and handleability.

The (C) phosphate flame retardant used in the present invention is preferably in a liquid state at room temperature (25° C.) from the viewpoint of handleability. Here, a liquid state is defined as having a viscosity that can be easily confirmed visually to be flowing. It is also preferable that there is no turbidity, crystals, or solid precipitation.

The viscosity of the (C) phosphate flame retardant used in the present invention is preferably from 17,500 to 40,000 mPa-s at 25° C., and more preferably from 18,500 to 37,000 mPa-s, still more preferably from 19,500 to 32,000 mPa-s, and most preferably from 19,500 to 28,000 mPa-s, from the viewpoint of storage stability and handleability.

The viscosity in the present invention can be measured using a B-type viscometer in accordance with the JIS K 7117-1 standard.

Specific examples of the (C) phosphate flame retardant used in the present invention include the following phosphate esters No. 1 to No. 8. Each of n11 to n18 in the following phosphate esters No. 1 to No. 8 is a number 1, 2, 3, 4, 5, 6 or 7.

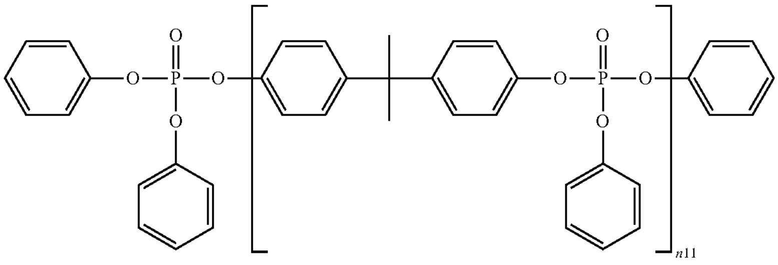
Phosphate ester No. 1
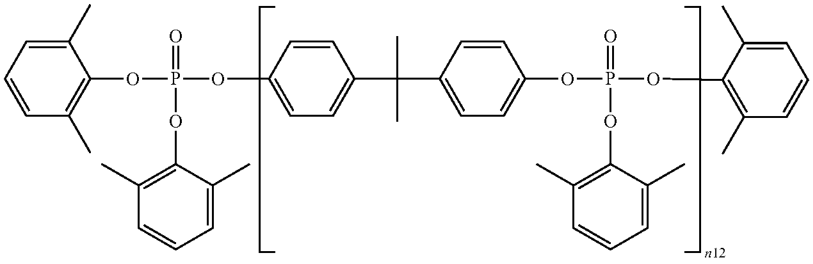
Phosphate ester No. 2
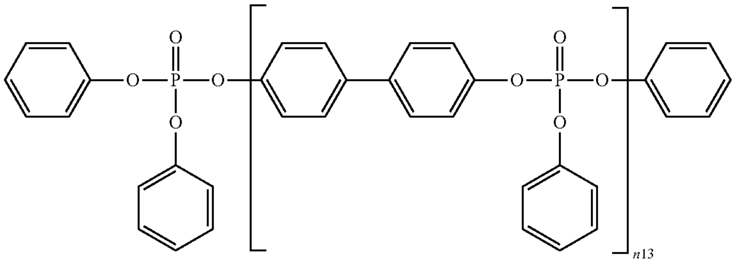
Phosphate ester No. 3
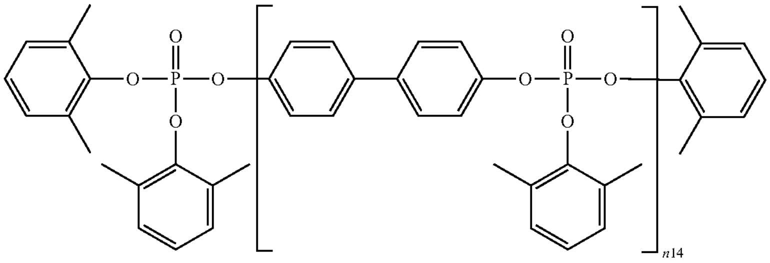
Phosphate ester No. 4
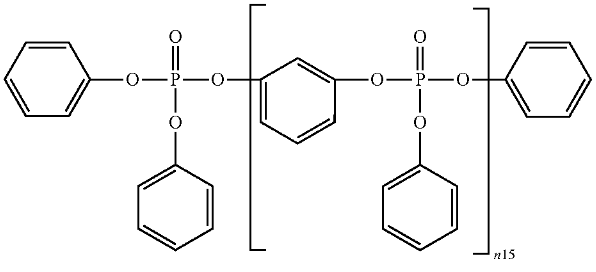
Phosphate ester No. 5

-continued

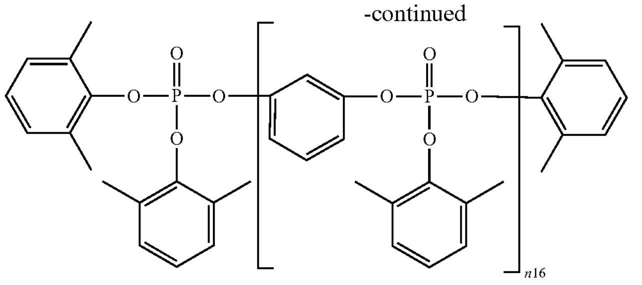

Phosphate ester No. 6

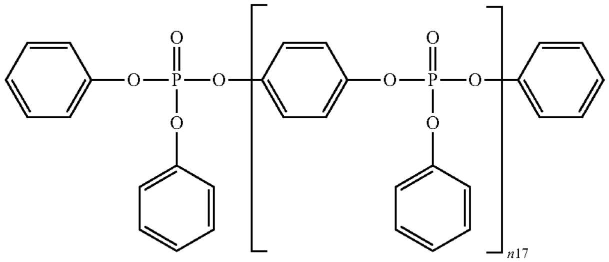

Phosphate ester No. 7

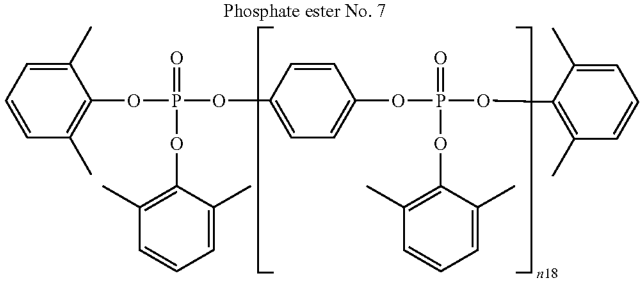

Phosphate ester No. 8

These phosphate compounds may be used singly, or in combination of two or more kinds thereof.

From the viewpoint of storage stability and handleability, one or more of the above phosphate flame retardants No. 1, No. 3, No. 5, and No. 7 are preferable for the (C) phosphate flame retardant used in the present invention, and from the viewpoint of flame retardancy, phosphate ester No. 3 is more preferable.

The amount of the (C) component in the resin composition of the present invention is from 5 to 30 parts by mass with respect to 100 parts by mass of the total of the (A) to (C) components of the present invention, and from the viewpoint of processability, flame retardancy, and drip prevention, the amount is preferably from 10 to 25 parts by mass, and more preferably from 12 to 20 parts by mass.

The manufacturing method of the (C) phosphate flame retardant used in the present invention is not particularly restricted, and for example, in the case of the phosphate ester No. 3 above, the retardant can be manufactured by reacting 4,4'-dihydroxybiphenyl, phenol, and phosphorus oxychloride in the presence of a catalyst such as magnesium chloride, and then dehydrochlorinating the reaction. By adjusting the amount of phosphorus oxychloride used for 4,4'-dihydroxybiphenyl, the percentage of a phosphate compound with n13=1 can be adjusted to from 50% by mass to 99% by mass. A preferred amount of phosphorus oxychloride used for 1.00 mol of 4,4'-dihydroxybiphenyl is preferably from 2.02 mol to 2.26 mol, more preferably from 2.04 mol to 2.24 mol, and more preferably from 2.06 mol to 2.19 mol.

The (C) phosphate flame retardant used in the present invention may contain, in addition to the above-described phosphate compound, another component to an extent that does not impair the effect of the present invention. As such another component, those exemplified below as components that can be blended in the resin composition of the present invention can be used.

In the resin composition of the present invention, another optional component may be blended together with the essential components (A), (B), and (C). The timing for blending the (A), (B), and (C) components, as well as another optional component, into the resin composition of the present invention is not particularly restricted. For example, two or more selected components other than the (A) component may be blended into the (A) polycarbonate resin by one-packing in advance, or each component other than the (A) component may be blended sequentially into the (A) polycarbonate resin. In the case of one-packing a plurality of components, each component may be crushed individually and then mixed, or mixed and then crushed.

Hereinafter, other optional components that can be blended into the resin composition of the present invention will be described.

The resin composition of the present invention may contain an organosulfonic acid metal salt to an extent that does not impair the effect of the present invention.

The organosulfonic acid metal salt that can be used is preferably an alkali metal salt or an alkaline earth metal salt, and particularly a sodium salt or a potassium salt. Specific examples thereof include sodium 3,4-dichlorobenzenesulfonate, sodium 2,4,5-trichlorobenzenesulfonate, sodium benzenesulfonate, disodium naphthalene-2,6-disulfonate, sodium p-iodobenzenesulfonate, sodium 4,4'-dibromodiphenyl-3-sulfonate, sodium 2,3,4,5,6-pentachloro-β-styrenesulfonate, sodium 4,4'-dichlorodiphenylsulfide-3-sulfonate, disodium tetrachlorodiphenyl ether disulfonate, 4,4'-dichlorobenzophenone-3,3'-disulfonate, sodium 2,5-dichlorothiophene-3-sulfonate, potassium diphenyl sulfone-3-sulfonate, sodium salt of 2,4,6-trichloro-5-sulfoisophthalic acid dimethyl, potassium salt of 2,4,5-trichlorobenzenesulfonic acid dichlorophenyl sulfonate, sodium 4'-[1,4,5,6,7,7'-hexachlorobicyclo-[2,2,1]-hept-5-en-end-yl]benzenesulfonate, potassium perfluorobutanesulfonate. Sodium 3,4-dichlorobenzenesulfonate, sodium 2,4,5-trichlorobenzenesulfonate, sodium benzenesulfonate, potassium diphenyl sulfone-3-sulfonate, and potassium perfluorobutane sulfonate are particularly preferred. These metal salts may be used singly, or in combination of two or more kinds thereof.

The resin composition of the present invention is preferably stabilized by further adding a phenolic antioxidant, a phosphorus antioxidant, a thioether antioxidant, a UV absorber, a hindered amine light stabilizer, or the like, if necessary.

Examples of the above-described phenolic antioxidant include 2,6-di-tert-butyl p-cresol, 2,6-diphenyl-4-octadecyloxyphenol, distearyl (3,5-di-tert-butyl-4-hydroxybenzyl) phosphonate, 1,6-hexamethylene bis[(3,5-di-3-butyl-4-hydroxyphenyl)propionic acid amide], 4,4'-thiobis(6-3-butyl-m-cresol), 2,2'-methylenebis(4-methyl-6-tert-butylphenol), 2,2'-methylenebis(4-ethyl-6-tert-butylphenol), 2,2'-methylenebis(4-ethyl-6-tert-butylphenol), 4,4'-butylidenebis(6-tert-butyl-m-cresol), 2,2'-ethylidenebis(4,6-di-tert-butylphenol), 2,2'-ethylidenebis(4,6-di-tert-butylphenol), 2,2'-ethylidenebis(4-dibutyl-6-tert-butylphenol), 1,1,3-tris(2-methyl-4-hydroxy-5-tert-butylphenyl)butane, 1,3,5-tris(2,6-dimethyl-3-hydroxy-4-tert-butylbenzyl)isocyanurate, 1,3,5-tris(3,5-di-3-butyl-4-hydroxybenzyl)isocyanurate, 1,3,5-tris (3,5-di-3-butyl-4-hydroxybenzyl)-2,4,6-trimethylbenzene, 2-tert-butyl-4-methyl-6-(2-acryloyloxy-3-tert-butyl-5-methylbenzyl)phenol, stearyl (3,5-di-tert-butyl-4-hydroxyphenyl)propionate, tetrakis[3-(3,5-di-tert-butyl-4-hydroxyphenyl)methyl propionate]methane, thiodiethylene glycol bis [(3,5-di-3-butyl-4-hydroxyphenyl)propionate], 1,6-hexamethylene bis[(3,5-di-3-butyl-4-hydroxyphenyl) propionate], bis[3,3-bis(4-hydroxy-3-tert-butylphenyl) butyric acid]glycol ester, bis[2-tert-butyl-4-methyl-6-(2-hydroxy-3-tert-butyl-5-methylbenzyl)phenyl]terephthalate, 1,3,5-tris[(3,5-di-3-butyl-4-hydroxyphenyl)propionyloxyethyl]isocyanurate, 3,9-bis[1,1-dimethyl-2-{(3-3-butyl-4-hydroxy-5-methylphenyl)propionyloxy}ethyl]-2,4,8,10-tetraoxaspiro[5,5]undecane, and triethylene glycol bis[(3-tert-butyl-4-hydroxy-5-methylphenyl)propionate].

The amount of these phenolic antioxidants used is preferably from 0.001 to 10 parts by mass with respect to 100 parts by mass of the (A) polycarbonate resin, and more preferably from 0.05 to 5 parts by mass.

Examples of the above-described phosphorus antioxidant include tris-nonylphenyl phosphite, tris[2-tert-butyl-4-(3-tert-butyl-4-hydroxy-5-methylphenylthio)-5-methylphenyl] phosphite, tridecyl phosphite, octyl diphenyl phosphite, didecyl monophenyl phosphite, bis(tridecyl)pentaerythritol diphosphite, bis(nonylphenyl)pentaerythritol diphosphite, bis(2,4-di-tert-butylphenyl)pentaerythritol diphosphite, bis (2,6-di-3-butyl-4-methylphenyl)pentaerythritol diphosphite, bis(2,4,6-tri-3-butylphenyl)pentaerythritol diphosphite, bis (2,4-dicumylphenyl)pentaerythritol diphosphite, tetrakis(tridecyl)isopropylidene diphenol diphosphite, tetrakis(tridecyl)-4,4'-n-butylidenebis(2-tert-butyl-5-methylphenol) diphosphite, hexakis (tridecyl)-1,1,3-tris(2-methyl-4-hydroxy-5-tert-butylphenyl)butanediphosphite, tetrakis(2,4-di-tert-butylphenyl)biphenylenediphosphonite, 9,10-dihydro-9-oxa-10-phosphaphenanthrene-10-oxide, 2,2'-methylene bis(4,6-tert-butylphenyl)-2-ethylhexyl phosphite, 2,2'-methylene bis(4,6-tert-butylphenyl)-octadecyl phosphite, 2,2'-ethylidene bis(4,6-di-tert-butylphenyl)-fluorophosphite, tris(2-[(2,4,8,10-tetrakis-3-butyldibenzo[d,f][1,3,2]dioxaphosphepin-6-yl)oxylethyl]amine, and phosphite of 2-ethyl-2-butylpropylene glycol and 2,4,6-tri-tert-butylphenol.

The amount of these phosphorus antioxidants used is preferably from 0.001 to 10 parts by mass, more preferably from 0.05 to 5 parts by mass, with respect to 100 parts by mass of the (A) polycarbonate resin.

Examples of the above-described thioether antioxidant include a dialkyl thiodipropionate such as dilauryl thiodipropionate, dimyristyl thiodipropionate, or distearyl thiodipropionate; and a pentaerythritol tetrakis(β-alkylmercaptopropionate.

The amount of these thioether antioxidants used is preferably from 0.001 to 10 parts by mass, more preferably from 0.05 to 5 parts by mass, with respect to 100 parts by mass of the (A) polycarbonate resin.

Examples of the above-described UV absorber include a 2-hydroxybenzophenone such as 2,4-dihydroxybenzophenone, 2-hydroxy-4-methoxybenzophenone, 2-hydroxy-4-octoxybenzophenone, or 5,5'-methylenebis(2-hydroxy-4-methoxybenzophenone); a 2-(2'-hydroxyphenyl) benzotriazole such as 2-(2'-hydroxy-5'-methylphenyl) benzotriazole, 2-(2'-hydroxy-3',5'-di-tert-butylphenyl)-5-chlorobenzotriazole, 2-(2'-hydroxy-3'-tert-butyl-5'-methylphenyl)-5-chlorobenzotriazole, 2-(2'-hydroxy-5'-tert-octylphenyl)benzotriazole, 2-(2'-hydroxy-3',5'-dicumylphenyl)benzotriazole, 2,2'-methylenebis(4-tert-octyl-6-(benzotriazolyl)phenol), or 2-(2'-hydroxy-3'-tert-butyl-5'-carboxyphenyl)benzotriazole; a benzoate such as phenylsalicylate, resorcinol monobenzoate, 2,4-di-3-butylphenyl-3,5-di-3-butyl-4-hydroxybenzoate, 2,4-di-3-amylphenyl-3,5-di-3-butyl-4-hydroxybenzoate, or hexadecyl-3,5-di-tert-butyl-4-hydroxybenzoate; a substituted oxanilide such as 2-ethyl-2'-ethoxyoxanilide or 2-ethoxy-4'-dodecyloxanilide; a cyanoacrylate such as ethyl-α-cyano-β, β-diphenyl acrylate or methyl-2-cyano-3-methyl-3-(p-methoxyphenyl) acrylate; and a triaryltriazine such as 2-(2-hydroxy-4-octoxyphenyl)-4,6-bis(2,4-di-tert-butylphenyl)-s-triazine, 2-(2-hydroxy-4-methoxyphenyl)-4,6-diphenyl-s-triazine, or 2-(2-hydroxy-4-propoxy-5-methylphenyl)-4,6-bis(2,4-di-tert-butylphenyl)-s-triazine.

The amount of these UV absorbers used is preferably from 0.001 to 30 parts by mass, more preferably from 0.05 to 10 parts by mass, with respect to 100 parts by mass of the (A) polycarbonate resin.

Examples of the above-described hindered amine light stabilizer include 2,2,6,6-tetramethyl-4-piperidylstearate, 1,2,2,6,6-pentamethyl-4-piperidylstearate, 2,2,6,6-tetramethyl-4-piperidylbenzoate, bis(2,2,6,6-tetramethyl-4-piperidyl) sebacate, bis(1,2,2,6,6-pentamethyl-4-piperidyl) sebacate, tetrakis(2,2,6,6-tetramethyl-4-piperidyl)-1,2,3,4-butane tetracarboxylate, tetrakis(1,2,2,6,6-pentamethyl-4-piperidyl)-1,2,3,4-butane tetracarboxylate, bis(2,2,6,6-tetramethyl-4-piperidyl)-bis(tridecyl)-1,2,3,4-butane tetracarboxylate, bis(1,2,2,6,6-pentamethyl-4-piperidyl)-bis (tridecyl)-1,2,3,4-butane tetracarboxylate, bis(1,2,2,6,6-pentamethyl-4-piperidyl)-2-butyl-2-(3,5-di-3-butyl-4-hydroxybenzyl) malonate, 1-(2-hydroxyethyl)-2,2,6,6-tetramethyl-4-piperidinol/succinic acid diethyl polycondensation, 1,6-bis(2,2,6,6-tetramethyl-4-piperidylamino) hexane/2,4-dichloro-6-morpholino-s-triazine polycondensation, 1,6-bis (2,2,6,6-tetramethyl-4-piperidylamino) hexane/2,4-dichloro-6-tert-octylamino-s-triazine polycondensation, 1,5,8,12-tetrakis[2,4-bis(N-butyl-N-(2,2,6,6-tetramethyl-4-piperidyl)amino)-s-triazine-6-yl]-1,5,8,12-tetraazadododecane, 1,5,8,12-tetrakis[2,4-bis(N-butyl-N-(1,2,2,6,6-pentamethyl-4-piperidyl)amino)-s-triazine-6-yl]-1,5,8-12-tetraazadododecane, 1,6,11-tris[2,4-bis(N-butyl-N-(2,2,6,6-tetramethyl-4-piperidyl)amino)-s-triazine-6-yl] aminoundecane, 1,6,11-tris[2,4-bis(N-butyl-N-(1,2,2,6,6-pentamethyl-4-piperidyl)amino)-s-triazine-6-yl] aminoundecane, bis(2,2,6,6-tetramethyl-1-octyloxy-4-piperidyl) decanedioate, bis(2,2,6,6-tetramethyl-1-undecyloxypiperidin-4-yl) carbonate, and TINUVIN NOR 371 manufactured by BASF Company.

The amount of these hindered amine light stabilizers used is preferably from 0.001 to 30 parts by mass, more preferably from 0.05 to 10 parts by mass, with respect to 100 parts by mass of the (A) polycarbonate resin.

An antistatic agent, a crystal nucleating agent (nucleating agent), a plasticizer, a lubricant, a metallic soap, a hydrotalcite, a triazine ring-containing compound, a metal hydroxide, an inorganic phosphorus flame retardant, a silicon flame retardant, another inorganic flame retardant, another organic flame retardant, an anti-drip agent, a filler, a pigment, a foaming agent, or the like may be added to the resin composition of the present invention if necessary, to an extent that does not impair an effect of the present invention.

Examples of the above-described triazine ring-containing compound include melamine, ammeline, benzoguanamine, acetoguanamine, phthalodiguanamine, melamine cyanurate, melamine phosphate, melamine pyrophosphate, melamine polyphosphate, butylenediguanamine, norbornenediguanamine, methylenediguanamine, ethylenedimelamine, trimethylenedimelamine, tetramethylenedimelamine, hexamethylenedimelamine, and 1,3-hexylenedimelamine.

Examples of the above-described metal hydroxide include magnesium hydroxide, aluminum hydroxide, calcium hydroxide, barium hydroxide, zinc hydroxide, KISMA 5A (magnesium hydroxide: trade name manufactured by Kyowa Chemical Industry Co., Ltd.

Examples of the above-described other inorganic flame retardant include an inorganic compound such as zinc oxide, titanium dioxide, aluminum oxide, magnesium oxide, or hydrotalcite, and a surface-treated product thereof. In the present invention, various commercial products such as TIPAQUE R-680 (titanium dioxide: trade name manufactured by ISHIHARA SANGYO KAISHA, LTD.), KYOWA MAG 150 (magnesium oxide: trade name manufactured by Kyowa Chemical Industry Co., Ltd.), DHT-4A (hydrotalcite: trade name manufactured by Kyowa Chemical Industry Co., Ltd.), or ALKAMIZER 4 (zinc modified hydrotalcite: trade name manufactured by Kyowa Chemical Industry Co., Ltd.) can be used.

Examples of the above-described other organic flame retardant aid include pentaerythritol.

Examples of the above-described anti-drip agent include a silicone rubber, a smectite clay mineral such as saponite, montmorillonite, hectorite, beidellite, stibnite, or nontronite, and a layered silicate such as talc, vermiculite, halloysite, or swollen mica.

When a fluorinated resin such as polytetrafluoroethylene, polyvinylidene fluoride, or polyhexafluoropropylene is used as an anti-drip agent, the melt flowability of a resin composition during a molding process may be reduced, resulting in a molding defect. In view of this, in the resin composition of the present invention, the content of the fluorine-containing resin is preferably 0.15 parts by mass or less, more preferably 0.05 parts by mass or less, and still more preferably 0.02 parts by mass or less, with respect to 100 parts by mass of the resin composition of the present invention, and it is particularly preferable that no fluorine-containing resin is contained. In particular, the content of the PTFE is preferably 0.15 parts by mass or less, more preferably 0.05 parts by mass or less, and still more preferably 0.02 parts by mass or less, with respect to 100 parts by mass of the resin composition of the present invention, and it is particularly preferable that no PTFE is contained.

In the resin composition of the present invention, an additive usually used for synthetic resins, such as a cross-linking agent, an antistatic agent, an antifogging agent, an anti-plate-out agent, a surface treatment agent, a plasticizer, a lubricant, a reinforcing agent, another flame retardant, a fluorescent agent, a mold inhibitor, a fungicide, a foaming agent, a metal deactivating agent, a mold release agent, a pigment, a processing aid, an antioxidant, a light stabilizer, a silicone oil, or a silane coupling agent, can be further blended, if necessary, to an extent that does not impair an effect of the present invention.

The form of the resin composition of the present invention is not particularly limited, and from the viewpoint of handleability of the resin composition, the resin composition is preferably in the form of pellets, powder, granules, or flakes, and the form of pellets is more preferable.

The resin compositions of the present invention can be used singly or in combination with a resin composition other than the present invention, an additive component, or a mixture thereof, for molding or the like. The resin composition of the present invention can also be used as a master batch.

<Molded Object>

The molded object of the present invention can be obtained by molding the resin composition of the present invention by a known method. The above-described molding method is not particularly limited, and examples thereof include extrusion molding, calendar molding, injection molding, roll molding, compression molding, and blow molding. With these molding methods, molded objects of various shapes, such as a resin plate, a sheet, a film, a pellet, and an irregularly shaped product, can be produced.

The molded object of the present invention is particularly suitable for use in the form of a thin resin plate, a sheet, a film, or an irregularly shaped product, due to the excellent flame retardant performance.

The thickness of the molded object of the present invention is not particularly limited, and from the viewpoint of improving the balance between mechanical strength, such as flame retardancy or rigidity, and light weight, the lower limit of the thickness is preferably 0.1 mm, more preferably 0.3 mm, and still more preferably 0.5 mm. The upper limit value of the thickness is preferably 1.0 mm, more preferably 0.9 mm, and still more preferably 0.8 mm.

The resin compositions and molded objects can be used in a wide range of industrial fields, including electric, electronics, and communications, agriculture, forestry, fisheries, mining, construction, food, textiles, clothing, medicine, coal, oil, rubber, leather, automobiles, precision equipment, wood, construction materials, civil engineering, furniture, printing, and musical instruments. More specifically, the resin composition of the present invention is used for applications such as: office automation equipment such as printers, personal computers, word processors, keyboards, PDAs (small information terminals), telephones, copiers, facsimiles, ECRs (electronic cash registers), calculators, electronic organizers, cards, holders, and stationery; home appliances such as washing machines, refrigerators, vacuum cleaners, microwave ovens, lighting fixtures, game consoles, irons, and kotatsu; AV equipment such as TVs, VTRs, video cameras, boom boxes, tape recorders, minidiscs, CD players, speakers, and LCD displays; electrical and electronic components such as connectors, relays, capacitors, switches, printed circuit boards, coil bobbins, semiconductor encapsulating materials, LED encapsulating materials, wires, cables, transformers, deflection yokes, distribution boards, and clocks; and telecommunication equipment.

The resin compositions and molded objects of the present invention can also be used for optical material applications such as optical discs, CD discs, DVD discs, and lenses, as well as for glass substitute applications.

Furthermore, the resin compositions and molded objects of the present invention are used for various applications, such as: materials for automobiles, vehicles, ships, aircraft, buildings, housing, construction, and civil engineering, such as seats (stuffing, upholstery, and the like), belts, upholstery, convertible tops, armrests, door trims, rear package trays, carpets, mats, sun visors, wheel covers, mattress covers, air bags, insulating materials, hangers, suspension bands, wire covering materials, electrical insulating materials, paints, coating materials, flooring materials, coating materials, sheathing materials, flooring materials, bulkheads, carpets, wallpaper, wall coverings, exterior materials, interior materials, roofing materials, decking materials, wall materials, post materials, siding, fence materials, framing and preforms, window and door profiles, panels, shingles, wainscoting, terraces, balconies, soundproofing boards, thermal insulation boards, window materials; household goods, such as clothing, curtains, sheets, plywood, synthetic boards, carpets, entrance mats, sheets, buckets, hoses, containers, glasses, bags, cases, goggles, ski boards, rackets, tents, musical instruments; and sporting goods.

EXAMPLES

The present invention will be described in more detail by means of Examples, but the present invention is not limited in any way by these Examples. Formulations shown in the following Tables are all based on parts by mass.

Examples 1 to 15, Comparative Examples 1 to 7

Resin compositions were blended according to the formulations listed in the Tables below.

Details of components in the following Tables are as follows.

(A) Polycarbonate resin: Iupilon S-3000F (manufactured by Mitsubishi Engineering-Plastics Corporation, weight average molecular weight: 43,000)

(B) Glass fiber: chopped strand CS3PE-455S (Nitto Boseki Co., Ltd., cut length 3.0 mm, single fiber diameter 13 μm)

(C) Phosphate flame retardants: The following Test Compounds-1 to 5 were used.

Test Compound-1

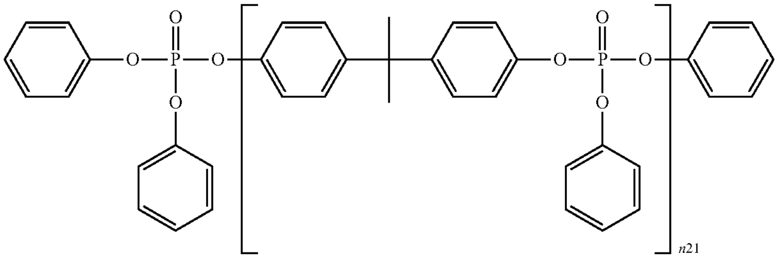

With respect to the total 100% by mass of compounds whose n21 in Test Compound-1 is 1, 2, 3, 4, 5, 6, or 7, the content of the compound whose n21 is 1 is 85.6% by mass, and the content of compounds whose n21 is 1, 2, 3, 4, and 5 is 100% by mass.

Test Compound-2

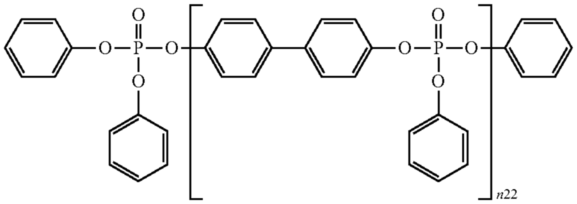

With respect to the total 100% by mass of compounds whose n22 in Test Compound-2 is 1, 2, 3, 4, 5, 6, or 7, the content of the compound whose n22 is 1 is 66.9% by mass, and the content of compounds whose n22 is 1, 2, 3, 4, and 5 is 99.8% by mass.

Test Compound-3

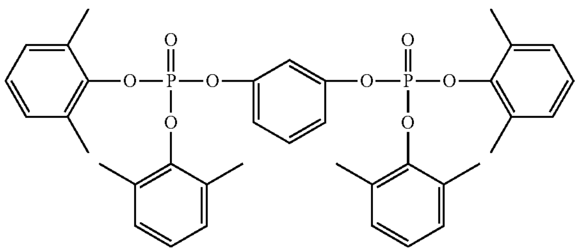

Test Compound-4

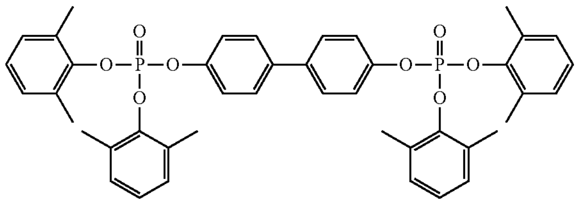

Test Compound-5

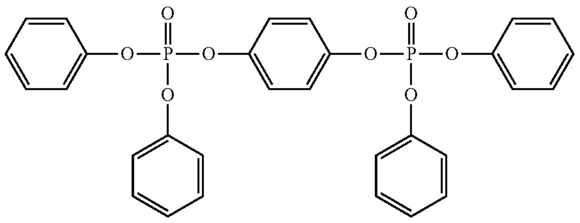

Next, pellets of each resin composition were extruded at 280° C. under processing conditions, and injection molded using these pellets under the following conditions to obtain 127 mm×12.7 mm×1.6 mm and 127 mm×12.7 mm×0.8 mm flame retardancy test pieces, and 80 mm×10 mm×4 mm flexural modulus test pieces.

In this case, the processability of a test piece for a flame retardancy test during injection molding was evaluated according to the following criteria, and the results are shown in the following Tables.

<Processing Conditions for Injection Molding>

Injection molding machine: EC60NII (manufactured by Toshiba Machine Co., Ltd.)

Cylinder temperature: 280° C.

Mold temperature: from 70 to 80° C.

Injection (upper limit) pressure: <200 MPa

Injection speed: from 40 to 220 mm/see

Holding pressure: from 40 to 60 MPa

<Processability Evaluation>

The processability of a resin composition was evaluated at the following two levels based on whether or not short shots occurred when the above-described UL-94V flame retardancy test piece (0.8 mm thick) was prepared by injection molding. Here, short shot refers to a phenomenon in which a resin solidifies before the resin is fully filled into a mold due to insufficient flowability of the molten resin during injection molding, resulting in an incompletely shaped molded product.

o: No short shots were generated and a test piece of a specified size was obtained.

x: Short shots occurred and a test piece of a specified size was not obtained.

A flame retardancy test and a flexural modulus test were conducted on each of the obtained test pieces under the following conditions, and the results of each test are shown in the following Tables.

<Flame Retardancy Test (UL-94V)>

The flame retardancy test piece (length 127 mm, width 12.7 mm, thickness 1.6 mm or 0.8 mm) obtained above was held vertically and a burner flame was applied to the lower end for 10 seconds, then the flame was removed, and the time until the fire ignited on the test piece was extinguished was measured. Next, a second flame was applied for 10 seconds at the same time as the flame was extinguished, and the time until the ignited fire was extinguished was measured in the same manner as the first time. Whether or not a falling tinder ignited a piece of cotton placed under the test piece was also evaluated at the same time.

Combustion ranks were assigned according to the UL-94V standard based on the combustion time of the first combustion and the second combustion, the presence or absence of cotton ignition, and the like.

<Flexural Modulus Test>

The flexural modulus test pieces obtained above (length 80 mm, width 10 mm, thickness 4 mm) were placed in a constant temperature and humidity machine at 23° C. for at least 48 hours after molding, and then the flexural modulus (unit: GPa) was measured in accordance with ISO 178 using an "AG-1kNIS fully automatic plastic bending tester" manufactured by Shimadzu Corporation.

TABLE 1

| | | Example 1 | Example 2 | Example 3 | Example 4 | Example 5 | Example 6 | Example 7 |
|---|---|---|---|---|---|---|---|---|
| Composition (parts by mass) | (A) Polycarbonate resin | 70 | 70 | 65 | 68 | 65 | 58 | 55 |
| | (B) Glass fiber | 10 | 10 | 20 | 20 | 20 | 30 | 30 |
| | (C) Test Compound-1 | 20 | | 15 | | | 12 | 15 |
| | (C) Test Compound-2 | | 20 | | 12 | 15 | | |
| | (C) Test Compound-3 | | | | | | | |
| | (C) Test Compound-4 | | | | | | | |
| | (C) Test Compound-5 | | | | | | | |
| Evaluation results | UL-94V (1.6 mm) Evaluation rank | V-0 | V-0 | V-0 | V-0 | V-0 | V-0 | V-0 |
| | UL-94V (0.8 mm) Evaluation rank | V-2 | V-0 | V-2 | V-2 | V-0 | V-2 | V-2 |
| | Flexural modulus (GPa) | 5.0 | 5.0 | 7.5 | 6.2 | 7.0 | 8.9 | 9.0 |
| | Processability (injection molding, 0.8 mm thick) | ○ | ○ | ○ | ○ | ○ | ○ | ○ |

TABLE 2

| | | Example 8 | Example 9 | Example 10 | Example 11 | Example 12 | Example 13 | Example 14 | Example 15 |
|---|---|---|---|---|---|---|---|---|---|
| Composition (parts by mass) | (A) Polycarbonate resin | 58 | 55 | 55 | 55 | 58 | 45 | 69.9 | 57.99 |
| | (B) Glass fiber | 30 | 30 | 30 | 30 | 30 | 40 | 10 | 30 |
| | (C) Test Compound-1 | | | | | | | | |
| | (C) Test Compound-2 | 12 | 15 | | | | 15 | 20 | 12 |
| | (C) Test Compound-3 | | | 15 | | | | | |
| | (C) Test Compound-4 | | | | 15 | | | | |
| | (C) Test Compound-5 | | | | | 12 | | | |
| | PTFE | | | | | | | 0.1 | 0.01 |
| Evaluation results | UL-94V (1.6 mm) evaluation rank | V-0 | V-0 | V-0 | V-0 | V-0 | V-0 | V-0 | V-0 |
| | UL-94V (0.8 mm) evaluation rank | V-2 | V-0 | V-2 | V-2 | V-2 | V-2 | V-0 | V-2 |
| | Flexural modulus (GPa) | 8.4 | 8.6 | 9.4 | 8.6 | 9.0 | 11.4 | 5.0 | 8.4 |
| | Processability (injection molding, 0.8 mm thick) | ○ | ○ | ○ | ○ | ○ | ○ | ○ | ○ |

TABLE 3

| | | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Composition (parts by mass) | (A) Polycarbonate resin | 100 | 90 | 70 | 88 | 85 | 88 | 85 |
| | (B) Glass fiber | | 10 | 30 | | | | |
| | (C) Test Compound-1 | | | | 12 | 15 | | |
| | (C) Test Compound-2 | | | | | | 12 | 15 |
| Evaluation results | UL-94V (1.6 mm) evaluation rank | V-2 | V-2 | NR | V-2 | V-0 | V-2 | V-0 |
| | UL-94V (0.8 mm) evaluation rank | V-2 | V-2 | NR | V-2 | V-2 | V-2 | V-2 |
| | Flexural modulus (GPa) | 2.3 | 3.7 | 7.3 | 2.7 | 2.8 | 2.6 | 2.6 |
| | Processability (injection molding, 0.8 mm thick | ○ | ○ | ○ | ○ | ○ | ○ | ○ |

As shown in the above Tables, it was confirmed that compositions satisfying the present invention (Examples 1-15) have excellent flame retardancy and rigidity at the same time. On the other hand, compositions lacking one or more of the (B) component and (C) component (Comparative Examples 1-7) resulted in either an NR to V-2 rating for flame retardancy or inferior rigidity (flexural modulus) compared to Examples, and thus both flame retardancy and rigidity were not achieved at the same time.

From the above, it was confirmed that the resin compositions of the present invention have excellent flame retardancy and rigidity, and can be suitably used as flame retardant resin compositions.

The invention claimed is:

1. A glass-fiber-containing flame-retardant polycarbonate resin composition comprising
(A) a polycarbonate resin,
(B) glass fibers, and
(C) a phosphate flame retardant,
wherein
the composition comprises from 40 to 80 parts by mass of the (A) component, from 5 to 50 parts by mass of the (B) component, and from 15 to 30 parts by mass of the (C) component, with respect to 100 parts by mass of the total of the (A) to (C) components;
the (C)phosphate flame retardant comprises a compound having a structure represented by the following general formula (2)

(2)

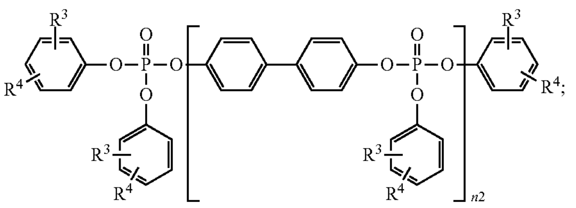

where $R^3$ and $R^4$ each independently represent a hydrogen atom or a methyl group, and n2 represents an integer from 1 to 7; and
0.15 parts by mass or less of a fluorine-containing resin is contained in 100 parts by mass of the glass-fiber-containing flame-retardant polycarbonate resin composition.

2. The glass-fiber-containing flame-retardant polycarbonate resin composition according to claim 1, wherein the content of the (B) glass fibers is from 10 to 40 parts by mass with respect to 100 parts by mass of the total of the (A) to (C) components.

3. The glass-fiber-containing flame-retardant polycarbonate resin composition according to claim 1, comprising no fluorine-containing resin.

4. The glass-fiber-containing flame-retardant polycarbonate resin composition according to claim 1, comprising no polytetrafluoroethylene.

5. The glass-fiber-containing flame-retardant polycarbonate resin composition according to claim 1, wherein the (B) glass fibers are chopped strands of converged single fibers, and the cut length of the chopped strands is from 1.0 mm to 5.0 mm.

6. The glass-fiber-containing flame-retardant polycarbonate resin composition according to claim 1, having a pellet form.

7. A molded object obtained from the glass-fiber-containing flame-retardant polycarbonate resin composition according to claim 1.

8. The molded object according to claim 7, wherein the thickness is from 0.1 mm to 1.0 mm.

9. The glass-fiber-containing flame-retardant polycarbonate resin composition according to claim 1, wherein the content of the (B) glass fibers is from 10 to 30 parts by mass with respect to 100 parts by mass of the total of the (A) to (C) components.

* * * * *